United States Patent
Lee et al.

(10) Patent No.: US 9,627,142 B2
(45) Date of Patent: Apr. 18, 2017

(54) MULTILAYER CERAMIC CAPACITOR AND BOARD FOR MOUNTING OF THE SAME

(71) Applicant: SAMSUNG ELECTRO-MECHANICS CO., LTD., Suwon-Si, Gyeonggi-Do (KR)

(72) Inventors: Kyo Kwang Lee, Suwon-Si (KR); Jin Kim, Suwon-Si (KR); Ju Eun Nam, Suwon-Si (KR); Young Ghyu Ahn, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/475,224

(22) Filed: Sep. 2, 2014

(65) Prior Publication Data
US 2015/0083477 A1    Mar. 26, 2015

(30) Foreign Application Priority Data

Sep. 24, 2013  (KR) .................. 10-2013-0113129
Jul. 11, 2014   (KR) .................. 10-2014-0087580

(51) Int. Cl.
*H05K 1/16*  (2006.01)
*H01G 4/30*  (2006.01)
(Continued)

(52) U.S. Cl.
CPC ............... *H01G 4/30* (2013.01); *H01G 4/012* (2013.01); *H01G 4/12* (2013.01); *H01G 4/224* (2013.01); *H01G 4/232* (2013.01)

(58) Field of Classification Search
CPC .......... H01G 4/12; H01G 4/224; H01G 4/232; H01G 4/30
(Continued)

(56) References Cited

U.S. PATENT DOCUMENTS 4,419,714 A  *  12/1983  Locke ..................... H01G 4/30
                                                      257/701
7,016,176 B1 *  3/2006  Sundstrom ............. H01G 2/065
                                                      29/25.41
(Continued)

FOREIGN PATENT DOCUMENTS

JP    2012-227491 A    11/2012
KR  10-2007-0119893 A  12/2007
(Continued)

OTHER PUBLICATIONS

Notice of Office Action Korean Patent Application No. 10-2014-0087580 dated Mar. 15, 2016 with full English translation.
(Continued)

*Primary Examiner* — Timothy Thompson
*Assistant Examiner* — Rhadames J Alonzo Miller
(74) *Attorney, Agent, or Firm* — McDermott Will & Emery LLP

(57) ABSTRACT

A multilayer ceramic capacitor may include a ceramic body including a plurality of dielectric layers; a first internal electrode disposed in the ceramic body and exposed to a first side surface in a width direction of the ceramic body and a second internal electrode disposed in the ceramic body and exposed to the first side surface in the width direction of the ceramic body; and first to third external electrodes disposed on the first side surface in the width direction of the ceramic body.

18 Claims, 14 Drawing Sheets

(51) Int. Cl.
  *H01G 4/012*  (2006.01)
  *H01G 4/12*  (2006.01)
  *H01G 4/224*  (2006.01)
  *H01G 4/232*  (2006.01)

(58) Field of Classification Search
  USPC ........................................ 174/260; 361/301.4
  See application file for complete search history.

(56) References Cited

U.S. PATENT DOCUMENTS

| | | | | |
|---|---|---|---|---|
| 8,238,116 | B2* | 8/2012 | Eggerding | H01G 4/012 |
| | | | | 361/301.4 |
| 2004/0042155 | A1* | 3/2004 | Ritter | H01G 4/30 |
| | | | | 361/309 |
| 2007/0002519 | A1* | 1/2007 | Li | H01G 4/255 |
| | | | | 361/303 |
| 2007/0165361 | A1* | 7/2007 | Randall | H01G 4/30 |
| | | | | 361/306.3 |
| 2008/0174934 | A1* | 7/2008 | Togashi | H01G 4/012 |
| | | | | 361/303 |
| 2008/0253059 | A1* | 10/2008 | Eggerding | H01G 4/012 |
| | | | | 361/301.4 |
| 2008/0310076 | A1* | 12/2008 | Ritter | H01G 2/06 |
| | | | | 361/302 |
| 2008/0310078 | A1* | 12/2008 | Lee | H01G 4/232 |
| | | | | 361/306.3 |
| 2010/0149769 | A1 | 6/2010 | Lee et al. | |
| 2010/0188799 | A1* | 7/2010 | Galvagni | H01G 4/012 |
| | | | | 361/306.3 |
| 2010/0243307 | A1* | 9/2010 | McConnell | H01G 4/232 |
| | | | | 174/260 |
| 2013/0050893 | A1* | 2/2013 | Kim | H01G 4/228 |
| | | | | 361/306.3 |
| 2013/0107421 | A1* | 5/2013 | Zenzai | H01G 4/12 |
| | | | | 361/321.1 |

FOREIGN PATENT DOCUMENTS

| | | |
|---|---|---|
| KR | 10-2008-0110180 A | 12/2008 |
| KR | 10-2009-0117686 A | 11/2009 |
| KR | 10-2013-0022825 A | 3/2013 |

OTHER PUBLICATIONS

First Office Action Chinese Patent Application No. 201410478234.7 dated Dec. 1, 2016 with full English translation.
Non-Final Office Action U.S. Appl. No. 15/339,198 dated Jan. 13, 2017.
AVX Low Inductance Capacitors; cover sheet, pp. 1-12, information sheet; available as publication Nov. 2001; http://www.avx.com/docs/masterpubs/lica.pdf.†

\* cited by examiner
† cited by third party

MULTILAYER CERAMIC CAPACITOR AND BOARD FOR MOUNTING OF THE SAME

CROSS-REFERENCE TO RELATED APPLICATION

This application claims the benefit of Korean Patent Application Nos. 10-2013-0113129 filed on Sep. 24, 2013 and 10-2014-0087580 filed on Jul. 11, 2014, with the Korean Intellectual Property Office, the disclosures of which are incorporated herein by reference.

BACKGROUND

The present disclosure relates to a multilayer ceramic capacitor and a board for mounting of the same.

Recently, in accordance with the trend for miniaturization and high capacitance of electronic products, electronic components used in the electronic products are required to have a miniaturized size and high levels of capacitance. Therefore, the demand for multilayer ceramic electronic components has increased.

In the case of multilayer ceramic capacitors, when an equivalent series inductance (ESL) is increased, performance of electronic products may be degraded. As electronic components are miniaturized and have high levels of capacitance, an ESL is increased and performance of electronic components may be significantly degraded thereby.

A so-called "low inductance chip capacitor (LICC)" is an element provided to decrease inductance in capacitors by decreasing a distance between external terminals so as to decrease the length of a current path.

Meanwhile, multilayer ceramic capacitors may have a structure in which a plurality of dielectric layers are stacked on each other and internal electrodes having different polarities from each other are alternately stacked to be interposed between dielectric layers.

Since the dielectric layers as above have piezoelectricity and electrostriction, when a direct current or alternating current voltage is applied to multilayer ceramic capacitors, a piezoelectric phenomenon may occur between internal electrodes, such that vibrations may be generated.

Such vibrations are transferred to printed circuit boards having multilayer ceramic capacitors mounted thereon through solders of multilayer ceramic capacitors, such that the entire printed circuit boards react as acoustic reflection surfaces to generate the vibration sound, noise.

The vibration sound, as described above, may correspond to an audible frequency in a region of 20 to 20000 Hz, which may cause listeners discomfort. The vibration sound causing listeners discomfort as described above refers to acoustic noise.

Research into multilayer ceramic capacitors for decreasing acoustic noise remains required.

RELATED ART DOCUMENT

Korean Patent Laid-Open Publication No. 2008-0110180

SUMMARY

An exemplary embodiment in the present disclosure may provide a multilayer ceramic capacitor and a board for mounting of the same.

According to an exemplary embodiment in the present disclosure, a multilayer ceramic capacitor may include a first internal electrode disposed in the ceramic body and having first noise adjusting portions exposed to one side surface of the ceramic body to be spaced apart from each other by a predetermined distance and a second internal electrode disposed in the ceramic body and having a third noise adjusting portion exposed to one side surface of the ceramic body and spaced apart from the first noise adjusting portions by a predetermined distance, and first to third external electrodes disposed on one side surface of the ceramic body and connected to the first to third noise adjusting portions, respectively. A distance between the first noise adjusting portions and the third noise adjusting portion, a distance from an end surface of the ceramic body in a length direction of the ceramic body to the first noise adjusting portion, and a length of the first noise adjusting portions and the third noise adjusting portion in the length direction of the ceramic body may be adjusted to control acoustic noise.

According to an exemplary embodiment in the present disclosure, a multilayer ceramic capacitor may include: a ceramic body including a plurality of dielectric layers; a first internal electrode disposed in the ceramic body and having first exposed portions exposed to a first side surface in a width direction of the ceramic body to be spaced apart from each other by a predetermined distance and a second internal electrode disposed in the ceramic body and having a third exposed portion exposed to the first side surface in the width direction of the ceramic body and spaced apart from the first exposed portions by a predetermined distance; and first to third external electrodes disposed on the first side surface in the width direction of the ceramic body and connected to the first to third exposed portions, respectively, wherein in the case that a distance between the first exposed portions and the third exposed portion is a, a distance from an end surface in a length direction of the ceramic body to the first exposed portions is b, a length of the third exposed portion in the length direction of the ceramic body is G1, and a length of the first exposed portions in the length direction of the ceramic body is G2, $0.235 \leq (G1+2*G2)/[2*(a+b)] \leq 2.500$ is satisfied.

According to an exemplary embodiment in the present disclosure, a multilayer ceramic capacitor may include: a ceramic body including a plurality of dielectric layers; a first internal electrode disposed in the ceramic body and having first exposed portions exposed to a second main surface in a thickness direction of the ceramic body to be spaced apart from each other by a predetermined distance and a second internal electrode disposed in the ceramic body and having a third exposed portion exposed to the second main surface in the thickness direction of the ceramic body and spaced apart from the first exposed portions by a predetermined distance; and first to third external electrodes disposed on the second main surface in the thickness direction of the ceramic body and connected to the first to third exposed portions, respectively, wherein in the case that a distance between the first exposed portions and the third exposed portion is a, a distance from an end surface in a length direction of the ceramic body to the first exposed portions is b, a length of the third exposed portion in the length direction of the ceramic body is G1, and a length of the first exposed portions in the length direction of the ceramic body is G2, $0.235 \leq (G1+2*G2)/[2*(a+b)] \leq 2.500$ is satisfied.

According an exemplary embodiment in the present disclosure, a board for mounting of a multilayer ceramic capacitor may include: a printed circuit board having first to third electrode pads formed on an upper portion thereof; and the multilayer ceramic capacitor as described above installed on the printed circuit board.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
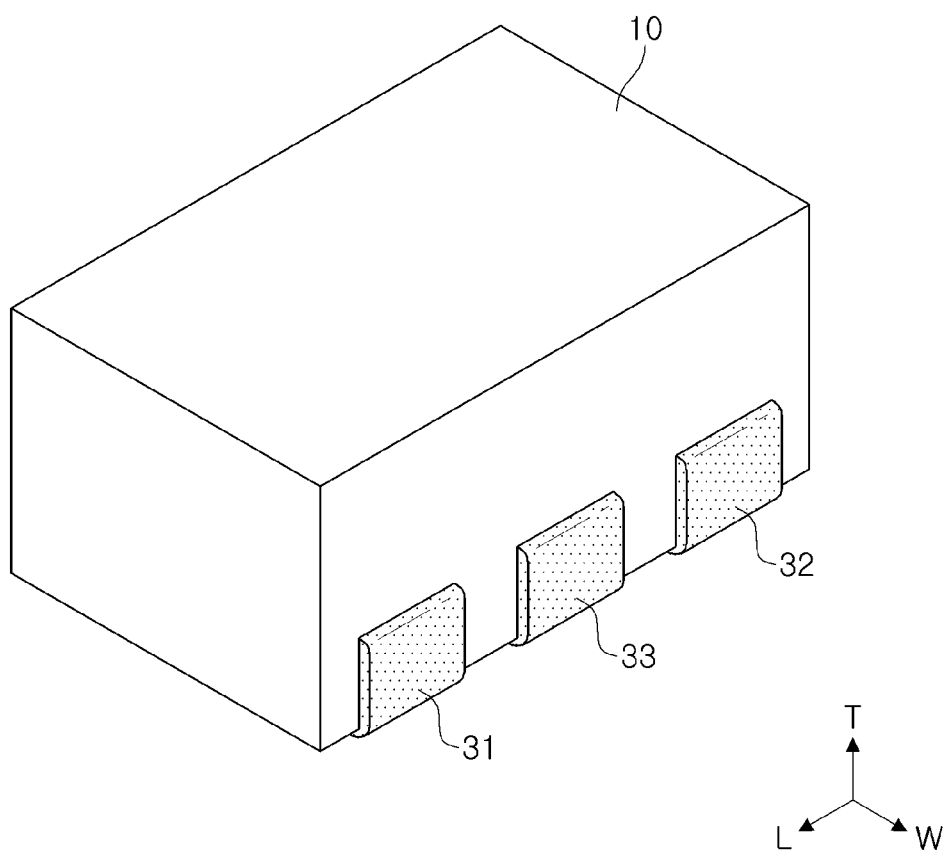
FIG. 1 is a perspective view showing a multilayer ceramic capacitor according to an exemplary embodiment in the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Multilayer Ceramic Capacitor

A multilayer ceramic capacitor according to an exemplary embodiment in the present disclosure includes a ceramic body including a plurality of dielectric layers; a first internal electrode disposed in the ceramic body and having first noise adjusting portions exposed to one side surface of the ceramic body to be spaced apart from each other by a predetermined distance and a second internal electrode disposed in the ceramic body and having a third noise adjusting portion exposed to one side surface of the ceramic body and spaced apart from the first noise adjusting portions by a predetermined distance; and first to third external electrodes disposed on one side surface of the ceramic body and connected to the first and third noise adjusting portions, respectively. Here, acoustic noise may be adjusted by adjusting a distance between the first noise adjusting portions and the third noise adjusting portion, a distance from an end surface of the ceramic body in a length direction thereof to the first noise adjusting portion, and a length of the first noise adjusting portions and the third noise adjusting portion in the length direction of the ceramic body.

According to an exemplary embodiment in the present disclosure, the distance between the first noise adjusting portion and the third noise adjusting portion, the distance from the end surface of the ceramic body in the length direction thereof to the first noise adjusting portion, and the length of the first noise adjusting portions and the third noise adjusting portion in the length direction of the ceramic body are adjusted, such that acoustic noise may be decreased at the time of mounting the multilayer ceramic capacitor on a printed circuit board and then applying a voltage thereto.

In detail, the distance between the first noise adjusting portion and the third noise adjusting portion may be relevant to an equivalent series inductance (ESL) value and an increase or decrease in acoustic noise.

In addition, the distance from the end surface of the ceramic body in the length direction thereof to the first noise adjusting portion may increase or decrease acoustic noise depending on a value thereof.

In addition, the length of the first noise adjusting portions and the third noise adjusting portion in the length direction of the ceramic body may influence an increase or decrease in acoustic noise and an equivalent series inductance (ESL).

According to an exemplary embodiment in the present disclosure, the distance between the first noise adjusting portion and the third noise adjusting portion, the distance from the end surface of the ceramic body in the length direction thereof to the first noise adjusting portion, and the length of the first noise adjusting portions and the third noise adjusting portion in the length direction of the ceramic body are adjusted, such that an equivalent series inductance of the multilayer ceramic capacitor may be decreased and acoustic noise may be decreased.

The first internal electrode may further include second noise adjusting portions exposed to the other side surface opposing one side surface of the ceramic body and the second internal electrode may further include a fourth noise adjusting portion exposed to the other side surface of the ceramic body and disposed to be spaced apart from the second noise adjusting portions by a predetermined distance.

The other side surface of the ceramic body may further have an insulating layer disposed thereon.

The multilayer ceramic capacitor according to an exemplary embodiment in the present disclosure may further include fourth to sixth external electrodes disposed on the other side surface of the ceramic body and connected to the second and fourth noise adjusting portions, respectively.

In the case that the distance between the first noise adjusting portion and the third noise adjusting portion is a, the distance from the end surface of the ceramic body in the length direction thereof to the first noise adjusting portion is b, the length of the third noise adjusting portion in the length direction of the ceramic body is G1, and the length of the first noise adjusting portion in the length direction of the ceramic body is G2, $0.235 \leq (G1+2*G2)/[2*(a+b)] \leq 2.500$ may be satisfied.

Hereinafter, although various modified examples of an exemplary embodiment of the present disclosure will be described with reference to the drawings, the present disclosure is not limited thereto.

FIG. 1 is a perspective view showing a multilayer ceramic capacitor according to an exemplary embodiment in the present disclosure.

Figure 2:
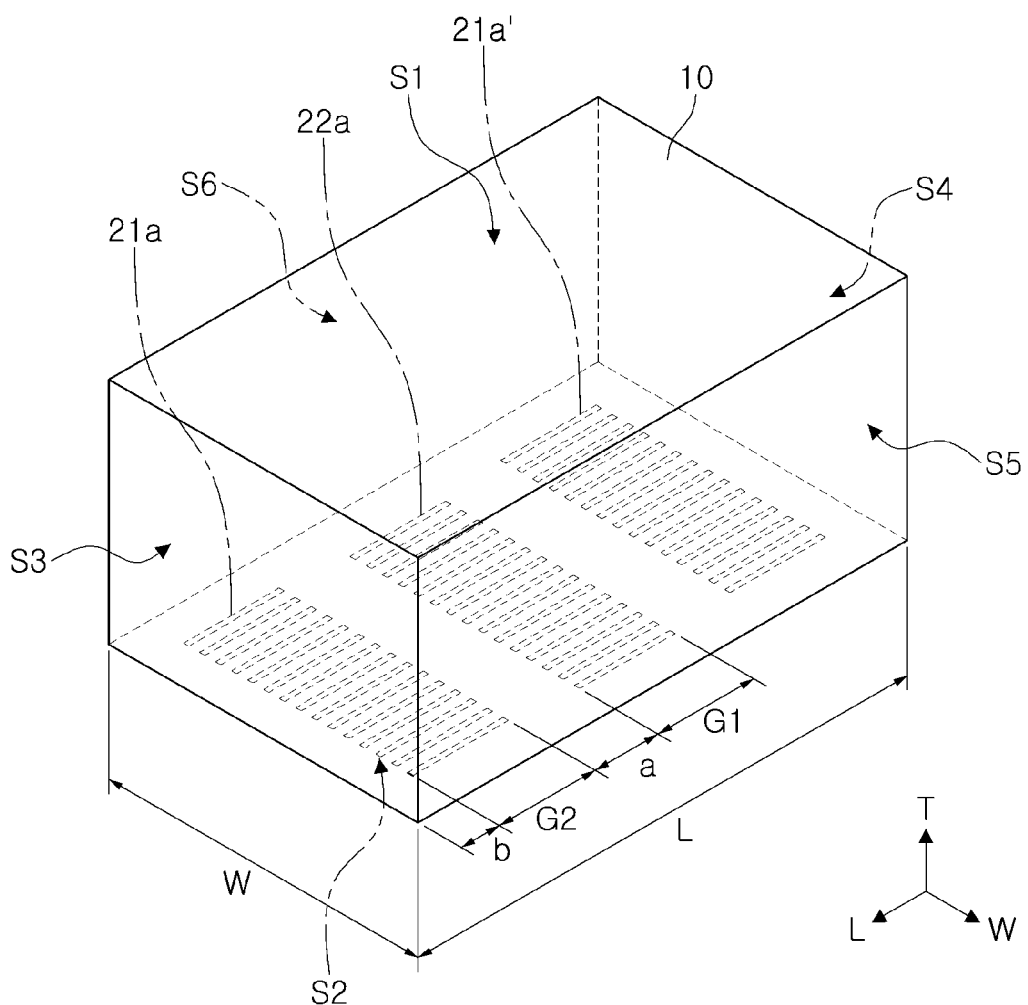
FIG. 2 is a schematic view showing a ceramic body of FIG. 1.

FIG. 2 is a schematic view showing a ceramic body according to an exemplary embodiment in the present disclosure.

Figure 3:
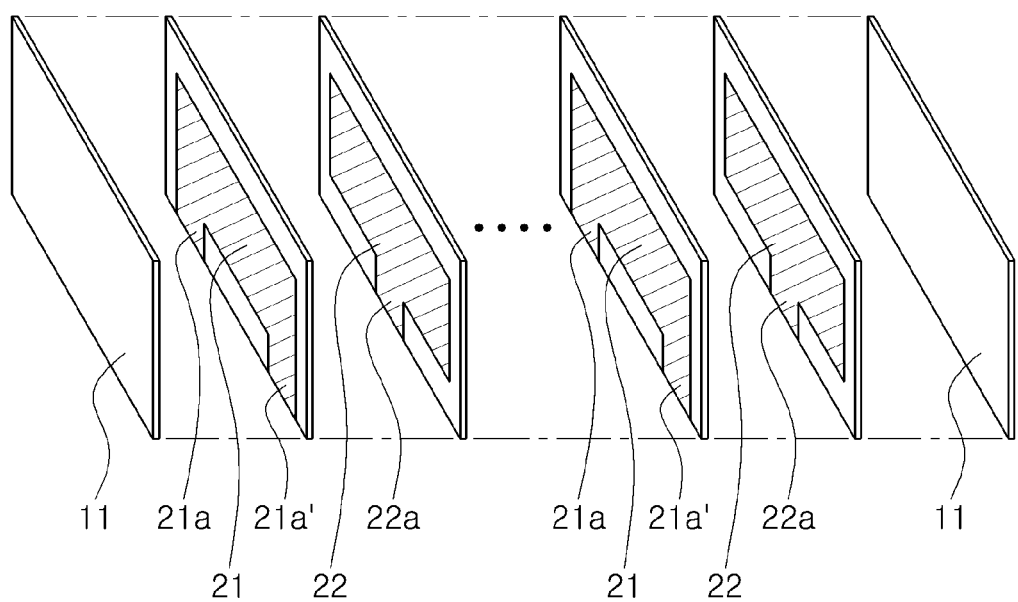
FIG. 3 is an exploded perspective view of FIG. 2.

FIG. 3 is an exploded perspective view of FIG. 2.

Referring to FIGS. 1 through 3, a multilayer ceramic capacitor 1 according to an exemplary embodiment in the present disclosure may include a ceramic body 10 including a plurality of dielectric layers 11; a first internal electrode 21 disposed in the ceramic body 10 and having first exposed portions 21a and 21a' exposed to a second main surface S2 in a thickness direction of the ceramic body 10 to be spaced apart from each other by a predetermined distance and a second internal electrode 22 disposed in the ceramic body 10 and having a third exposed portion 22a exposed to the second main surface S2 in the thickness direction of the ceramic body 10 and spaced apart from the first exposed portions 21a and 21a' by a predetermined distance; and first to third external electrodes 31, 32, and 33 disposed on the second main surface S2 in the thickness direction of the ceramic body 10 and connected to the first to third exposed portions 21a, 21a', and 22a, respectively, wherein in the case that a distance between the first exposed portions 21a and 21a' and the third exposed portion 22a is a, a distance from an end surface in a length direction of the ceramic body 10 to the first exposed portions 21a and 21a' is b, a length of the third exposed portion 22a in the length direction of the ceramic body 10 is G1, and a length of the first exposed portions 21a and 21a' in the length direction of the ceramic body 10 is G2, $0.235 \leq (G1+2*G2)/[2*(a+b)] \leq 2.500$ may be satisfied.

Hereinafter, a multilayer ceramic electronic component according to an exemplary embodiment in the present disclosure will be described. In detail, although a multilayer ceramic capacitor will be described, the present disclosure is not limited thereto.

Referring to FIG. 1, in the multilayer ceramic capacitor according to the exemplary embodiment in the present disclosure, a 'length direction' refers to an 'L' direction of FIG. 1, a 'width direction' refers to a 'W' direction of FIG. 1, and a 'thickness direction' refers to a 'T' direction of FIG. 1. Here, the 'thickness direction' is the same as a direction in which dielectric layers are stacked, for example, a 'stacking direction'.

Referring to FIG. 2, according to the exemplary embodiment in the present disclosure, the ceramic body 10 may have the first main surface S1 and the second main surface S2 opposing each other, and the first side surface S5 and the second side surface S6 in the width direction and the first end surface S3 and the second end surface S4 in the length direction, connecting the first main surface and the second main surface to each other. A shape of the ceramic body 10 is not particularly limited, but may be a hexahedral shape as shown in the drawing.

Referring to FIG. 3, a raw material forming the dielectric layer 11 is not particularly limited as long as sufficient capacitance can be obtained, and may be, for example, a barium titanate ($BaTiO_3$) powder.

In a material forming the dielectric layer 11, various ceramic additives, organic solvents, plasticizers, binders, dispersing agents, and the like may be added to a powder such as a barium titanate ($BaTiO_3$) powder, or the like, as needed, according to an embodiment of the present disclosure.

An average particle diameter of a ceramic powder used for forming the dielectric layer 11 is not particularly limited, but may be adjusted as needed, according to an embodiment of the present disclosure and may be adjusted to have an average particle diameter of, for example, 400 nm or less.

The dielectric layer 11 may have a thickness of 3 μm or less, but is not limited thereto.

A material forming the first and second internal electrodes 21 and 22 is not particularly limited, but may be formed using a conductive paste formed of, for example, at least one of a noble metal such as palladium (Pd), an palladium-silver (Pd—Ag) alloy, and the like, nickel (Ni), and copper (Cu).

The first internal electrode 21 and the second internal electrode 22 may be disposed to face each other, having the dielectric layer 11 interposed therebetween, and may be alternately exposed to the second main surface S2 in the thickness direction of the ceramic body 10.

The first and second internal electrodes 21 and 22 may include a capacitor part formed by allowing adjacent internal electrodes to be overlapped with each other to contribute to formation of capacitance, and an exposed portion formed by allowing the capacitor part to be extended and exposed to the exterior of the ceramic body.

The exposed portion is not particularly limited, but, for example, may have a distance shorter than that of the internal electrode configuring the capacitor part, in the length direction of the ceramic body 10.

The first internal electrode 21 may have the first exposed portions 21a and 21a' exposed to the second main surface S2 in the thickness direction of the ceramic body 10.

In addition, the first internal electrode 21 may be disposed to be spaced apart from the first and second side surfaces S3 and S4 in the length direction of the ceramic body 10 by a predetermined distance.

The case that the first internal electrode 21 may be disposed to be spaced apart from the first and second side surfaces S3 and S4 in the length direction of the ceramic body 10 by a predetermined distance means a state in which the first internal electrode 21 is insulated because it is not exposed to the first and second side surfaces S3 and S4.

Meanwhile, the second internal electrode 22 may have the third exposed portion 22a exposed to the second main surface S2 in the thickness direction of the ceramic body 10 and spaced apart from the first exposed portions 21a and 21a' by a predetermined distance.

The phrase "A is spaced apart from B by a predetermined distance" means a state in which A is insulated because A and B are not overlapped with each other, and the same will apply hereinafter.

In addition, the second internal electrode 22 may be disposed to be spaced apart from the first and second side surfaces S3 and S4 in the length direction of the ceramic body 10 by a predetermined distance.

The first exposed portions 21a and 21a' may be configured by two exposed portions respectively formed to be spaced apart from the third exposed portion 22a, but are not particularly limited.

The multilayer ceramic capacitor according to an exemplary embodiment in the present disclosure may be a vertical multilayer ceramic capacitor having a structure in which the first and second internal electrodes 21 and 22 are stacked on each other in a direction vertical with respect to the second main surface S2 in the thickness direction of the ceramic body 10 and may have three terminals, as shown in FIGS. 1 through 3, but is not limited thereto.

For example, the multilayer ceramic capacitor according to an exemplary embodiment in the present disclosure may have a form in which the internal electrodes stacked in the ceramic body are stacked to be perpendicular to a mounting surface of the board.

Since the multilayer ceramic capacitor 1 according to an exemplary embodiment in the present disclosure is the multilayer ceramic capacitor having the vertically-stacked structure as described above, a current path is relatively short upon being mounted on the board, such that equivalent series inductance (ESL) may be further decreased.

In detail, when the multilayer ceramic capacitor 1 according to an exemplary embodiment of the present disclosure is mounted on the board, a current may directly flow from an electrode pad on the circuit board to the internal electrode through a thickness of the external electrode without having a separate current path.

Thus, as compared to a multilayer ceramic capacitor 100 according to another exemplary embodiment in the present disclosure in which the internal electrode is horizontally mounted on the circuit board as described below, equivalent series inductance (ESL) may be further decreased.

A general multilayer ceramic electronic component may have the external electrodes disposed on side surfaces opposing each other in the length direction of the ceramic body.

In this case, since a current path is relatively long at the time of applying an alternating current to the external electrode, a current loop may be formed to be relatively great, and thus, a magnitude of an induced magnetic field is increased, such that inductance may be increased.

In order to solve the above-mentioned problem, according to the exemplary embodiment of the present disclosure, the first to third external electrodes 31, 32, and 33 may be disposed on the second main surface S2 in the thickness direction of the ceramic body 10 in order to decrease the length of the current path.

In addition, the first to third external electrodes 31, 32, and 33 may be formed to be extended to the first and second side surfaces S5 and S6 in the length direction of the ceramic body 10.

In this case, since distances between electrodes among the first to third external electrodes 31, 32, and 33 are relatively short, the current path is relatively short, such that the current loop may be decreased, thereby decreasing inductance.

As described above, the first to third external electrodes 31, 32, and 33 may be formed on the second main surface S2 in the thickness of the ceramic body 10, and may be electrically connected to the first and second internal electrodes 21 and 22 so as to form capacitance.

For example, the first and second external electrodes 31 and 32 may be connected to the first internal electrode 21, and the third external electrode 33 may be connected to the second internal electrode 22.

The first to third external electrodes 31, 32, and 33 may be formed of the same conductive material as those of the first and second internal electrodes 21 and 22, but are not limited thereto, and may be formed of, for example, copper (Cu), silver (Ag), nickel (Ni), or the like.

The first to third external electrodes 31, 32, and 33 may be formed by applying and then sintering a conductive paste prepared by adding glass frit to the metal powder.

A width W of the ceramic body 10 may be a distance between the first side surface S5 and the second side surface S6 in the width direction, and a length L of the ceramic body 10 may be a distance between the first end surface S3 and the second end surface S4 in the length direction.

According to the exemplary embodiment in the present disclosure, the width W between the first and second side surfaces S5 and S6 in the width direction of the ceramic body 10 may be shorter than or equal to the length L between the first end surface S3 and the second end surface S4 in the length direction of the ceramic body 10.

Thus, since the distances between electrodes among the first to third external electrodes 31, 32, and 33 are relatively short, the current path is relatively short, such that a size of a current loop thereof may be decreased, thereby decreasing inductance.

Referring to FIG. 2, in the multilayer ceramic capacitor according to the exemplary embodiment of the present disclosure, in the case that a distance between the first exposed portion 21$a$ and the third exposed portion 22$a$ is a, a distance from an end portion of the ceramic body 10 in the length direction thereof to the first exposed portion 21$a$ is b, a length of the third exposed portion 22$a$ in the length direction of the ceramic body is G1, and a length of the first exposed portion 21$a$ in the length direction of the ceramic body is G2, $0.235 \leq (G1+2*G2)/[2*(a+b)] \leq 2.500$ may be satisfied.

Although FIG. 2 illustrates a case in which the distance between the first exposed portion 21$a$ and the third exposed portion 22$a$ is indicated by a, a is not limited thereto and may refer to a distance between another first exposed portion 21$a'$ and the third exposed portion 22$a$.

In addition, although FIG. 2 illustrates a case in which the distance from the end portion of the ceramic body 10 in the length direction thereof to the first exposed portion 21$a$ is indicated by b, b is not limited thereto and may refer to a distance from the end portion of the ceramic body 10 in the length direction thereof to another first exposed portion 21$a'$.

In addition, the distance b from the end portion of the ceramic body 10 in the length direction thereof to the first exposed portion 21$a$ may refer to a distance from the first end surface S3 in the length direction of the ceramic body 10, adjacent to the first exposed portion 21$a$, to the first exposed portion 21$a$, and the distance from the end portion of the ceramic body 10 in the length direction thereof to another first exposed portion 21$a'$ may refer to a distance from the second end surface S4 in the length direction of the ceramic body 10 to another first exposed portion 21$a'$.

A relationship between the distance a between the first exposed portion 21$a$ and the third exposed portion 22$a$, the distance b from the end portion of the ceramic body 10 in the length direction thereof to the first exposed portion 21$a$, the distance G1 of the third exposed portion 22$a$ in the length direction of the ceramic body, and the distance G2 of the first exposed portion 21$a$ in the length direction of the ceramic body is adjusted to satisfy $0.235 \leq (G1+2*G2)/[2*(a+b)] \leq 2.500$, such that an equivalent series inductance (ESL) may be decreased, acoustic noise may be decreased, the multilayer ceramic capacitor having excellent reliability may be implemented.

In the case in which a value calculated by $(G1+2*G2)/[2*(a+b)]$ is less than 0.235, the equivalent series inductance (ESL) of the multilayer ceramic capacitor may be increased.

Meanwhile, in the case in which the value calculated by $(G1+2*G2)/[2*(a+b)]$ exceeds 2.500, acoustic noise may be increased and a short-circuit defect may be caused after mounting the multilayer ceramic capacitor on the board.

In $(G1+2*G2)/[2*(a+b)]$, since the distance G1 of the third exposed portion 22$a$ in the length direction of the ceramic body is related to acoustic noise and an equivalent series inductance (ESL), when a value of G1 is increased, the equivalent series inductance (ESL) is decreased, but acoustic noise may be increased.

In addition, in (G1+2*G2)/[2*(a+b)], as the distance a between the first exposed portion 21a and the third exposed portion 22a is decreased, the equivalent series inductance (ESL) is decreased, but acoustic noise may be increased.

In addition, in (G1+2*G2)/[2*(a+b)], as the distance b from the end portion of the ceramic body 10 in the length direction thereof to the first exposed portion 21a is increased, acoustic noise may be decreased.

For example, as the distance b from the end surface of the ceramic body 10 in the length direction thereof to the first exposed portion 21a is greater than 0 and is increased, a solder amount applied to the end portion of the multilayer ceramic capacitor in the length direction thereof at the time of mounting the multilayer ceramic capacitor on the board may be significantly reduced and a displacement amount of solder transferred to the board may be decreased, such that acoustic noise may be decreased.

In detail, the multilayer ceramic capacitor according to the exemplary embodiment in the present disclosure has the internal electrodes 21 and 22 disposed to be perpendicular to a board on which the multilayer ceramic capacitor is mounted, and since the internal electrodes 21 and 22 are not exposed to the first end surface S3 and the second end surface S4 in the length direction of the ceramic body 10 and the first to third external electrodes 31, 32, and 33 are not disposed on the first end surface S3 and the second end surface S4 in the length direction of the ceramic body 10, a solder amount applied to the end portion in the length direction of the multilayer ceramic capacitor is significantly low and a displacement amount of solder transferred to the board is decreased, such that acoustic noise may be decreased.

On the other hand, in a general case in which the multilayer ceramic capacitor has the internal electrodes disposed to be perpendicular to a board on which the multilayer ceramic capacitor is mounted, since the external electrodes are also disposed on the end surfaces of the ceramic body in the length direction thereof, acoustic noise may be increased.

Thus, according to an exemplary embodiment in the present disclosure, since the distance b from the end surface of the ceramic body 10 in the length direction thereof to the first exposed portion 21a is greater than 0, ceramic components in end portions of the ceramic body may contact each other at the time of sintering the ceramic body, such that the occurrence of defects such as cracks, delamination, or the like may be decreased.

For example, according to the exemplary embodiment in the present disclosure, in order to allow the equivalent series inductance of the capacitor to be decreased and acoustic noise to be decreased, the value calculated by (G1+2*G2)/[2*(a+b)] may be adjusted to satisfy a numeric value range of 0.235 or more to 2.500 or less.

Figure 4:
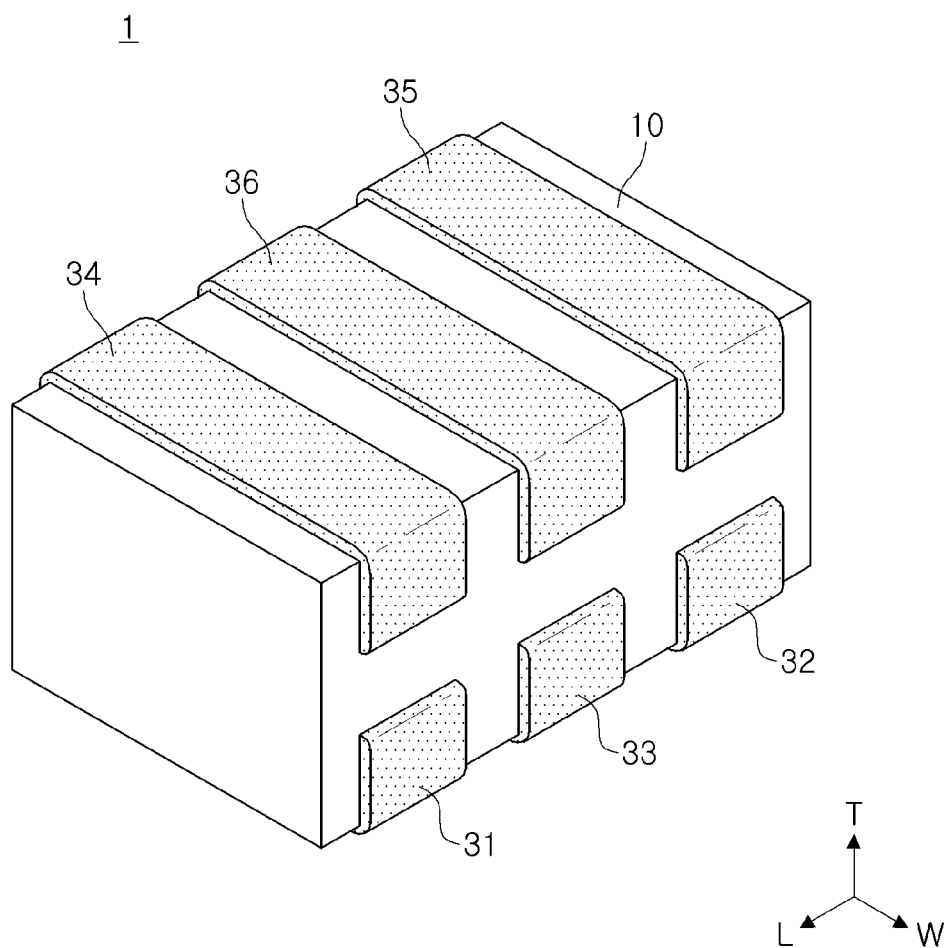
FIG. 4 is a perspective view showing a multilayer ceramic capacitor according to another exemplary embodiment in the present disclosure.

FIG. 4 is a perspective view showing a multilayer ceramic capacitor according to another exemplary embodiment in the present disclosure.

Figure 5:
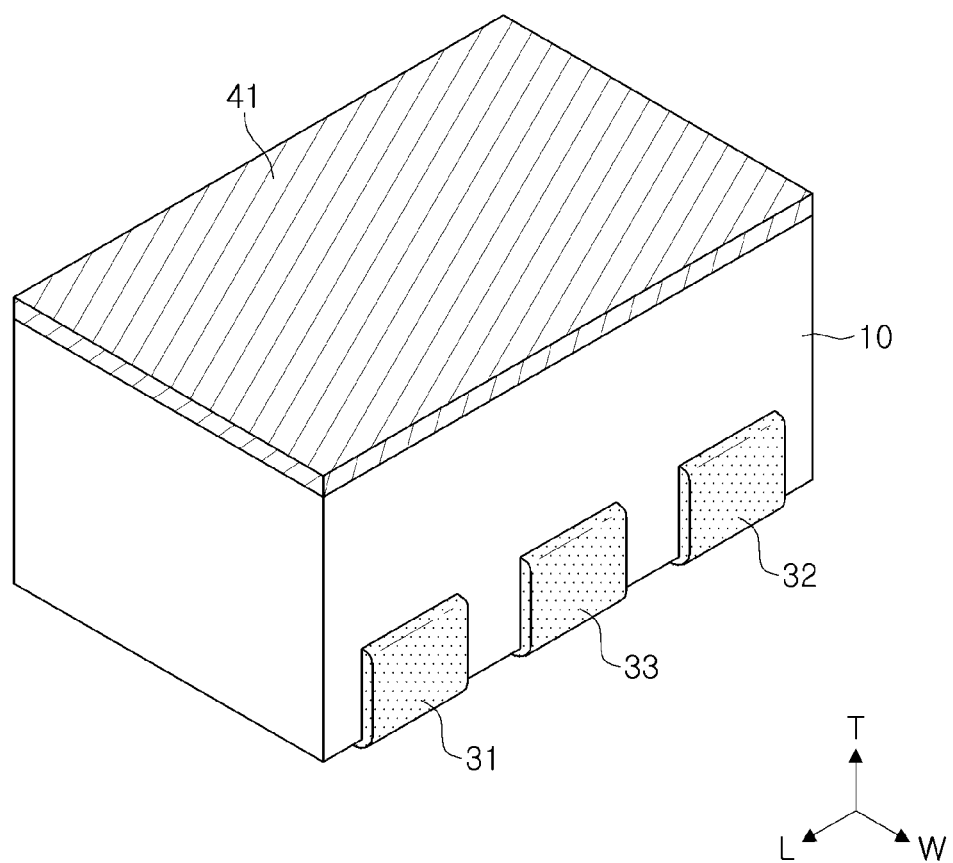
FIG. 5 is a perspective view showing a multilayer ceramic capacitor according to another exemplary embodiment in the present disclosure.

FIG. 5 is a perspective view showing a multilayer ceramic capacitor according to another exemplary embodiment in the present disclosure.

Figure 6:
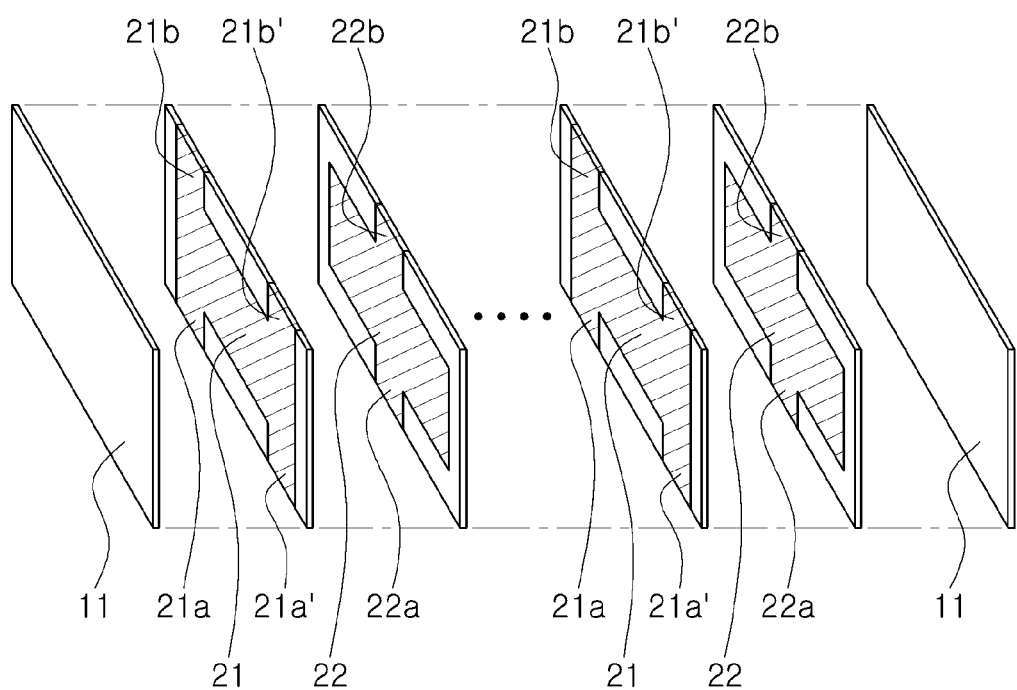
FIG. 6 is an exploded perspective view of FIGS. 4 and 5.

FIG. 6 is an exploded perspective view of FIGS. 4 and 5.

Referring to FIGS. 4 through 6, the multilayer ceramic capacitor according to another exemplary embodiment in the present disclosure may further include second exposed portions 21b and 21b' formed by the first internal electrode 21 exposed to a first main surface S1 in a thickness direction of the ceramic body 10 and a fourth exposed portion 22b formed by the second internal electrode 22 exposed to the first main surface S1 in the thickness direction of the ceramic body 10 and disposed to be spaced apart from the second exposed portions 21b and 21b' by a predetermined distance.

The second exposed portions 21b and 21b' may be configured by two exposed portions respectively formed to be spaced apart from the fourth exposed portion 22b, but are not particularly limited.

Referring to FIG. 4, the multilayer ceramic capacitor according to another exemplary embodiment in the present disclosure may further include fourth to sixth external electrodes 34, 35, and 36 disposed on the first main surface S1 in the thickness direction of the ceramic body 10.

In this case, the fourth to sixth external electrodes 34, 35, and 36 may be electrically connected to the first and second internal electrodes 21 and 22.

The fourth to sixth external electrodes 34, 35, and 36 may be formed to be extended to the first and second side surfaces S5 and S6 in a width direction of the ceramic body 10.

Referring to FIG. 5, the multilayer ceramic capacitor according to another exemplary embodiment in the present disclosure may further include an insulating layer 41 disposed on the first main surface S1 in the thickness direction of the ceramic body 10.

In this case, the second exposed portions 21b and 21b' and the fourth exposed portion 22b are exposed to the first main surface S1 in the thickness direction of the ceramic body 10, but are insulated by the insulating layer 41, such that reliability may not be deteriorated.

Figure 7:
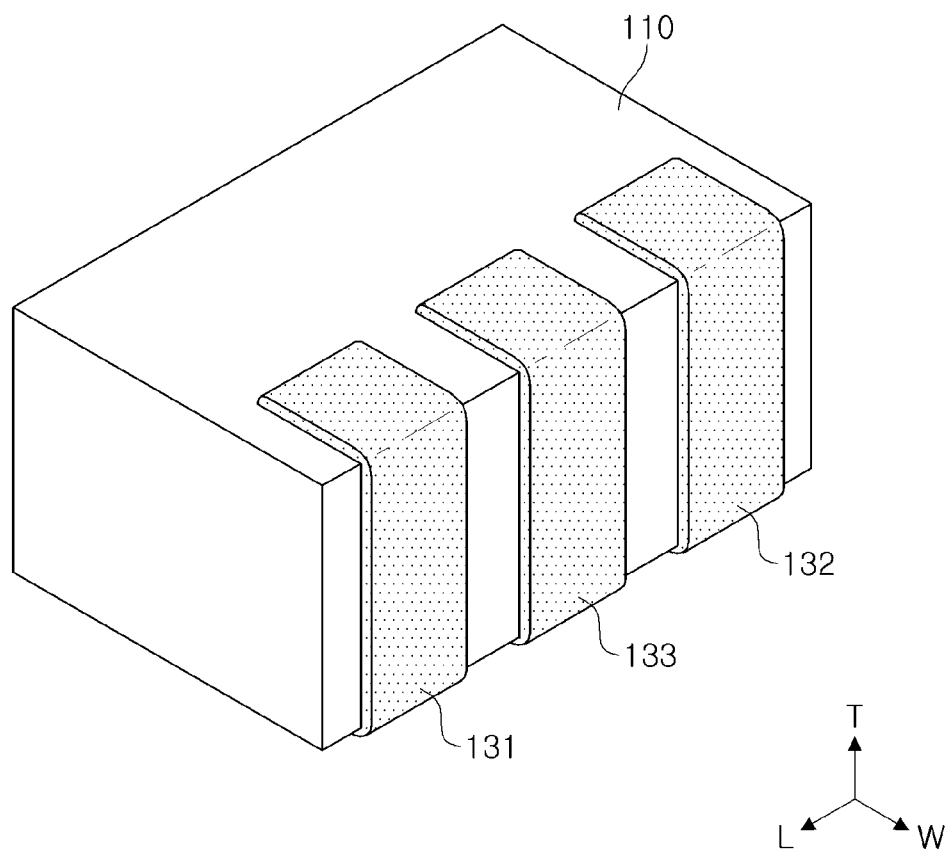
FIG. 7 is a perspective view showing a multilayer ceramic capacitor according to another exemplary embodiment in the present disclosure.

FIG. 7 is a perspective view showing a multilayer ceramic capacitor according to another exemplary embodiment in the present disclosure.

Figure 8:
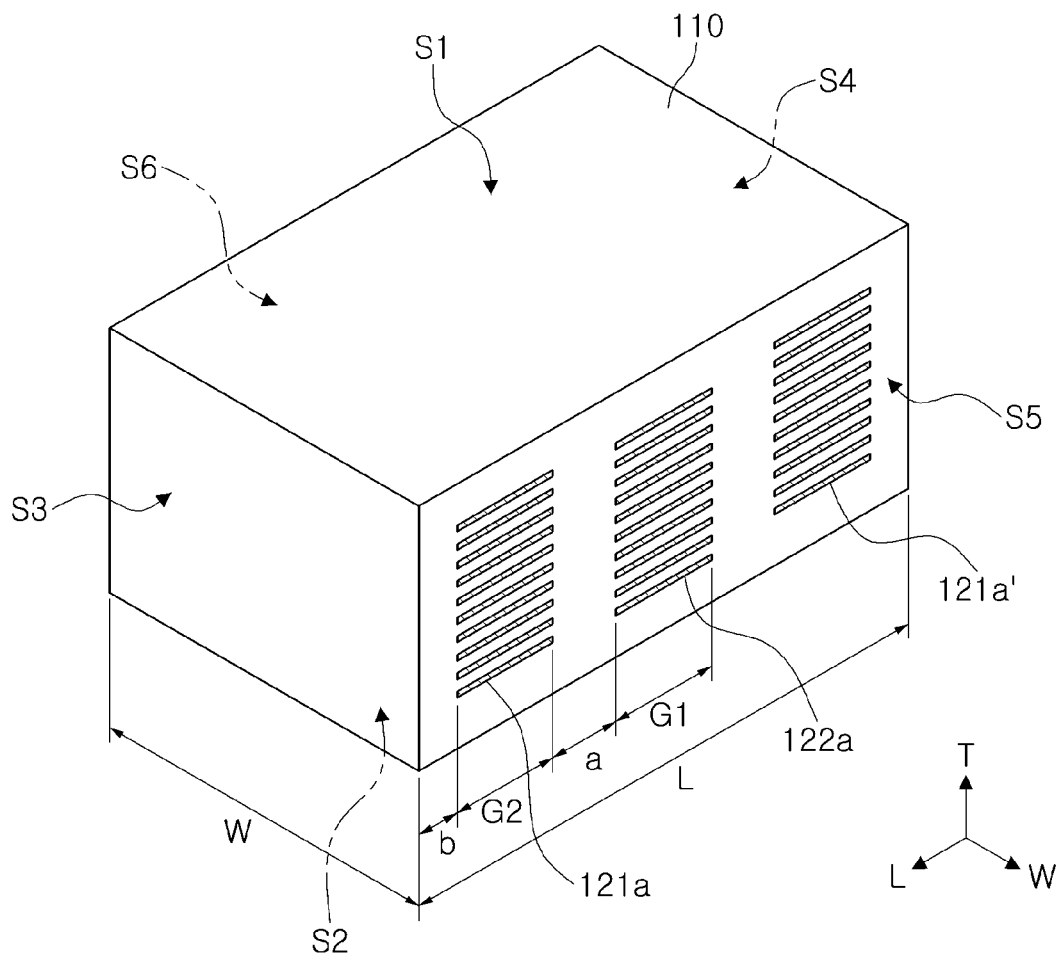
FIG. 8 is a schematic view showing a ceramic body of FIG. 7.

FIG. 8 is a schematic view showing a ceramic body of FIG. 7.

Figure 9:
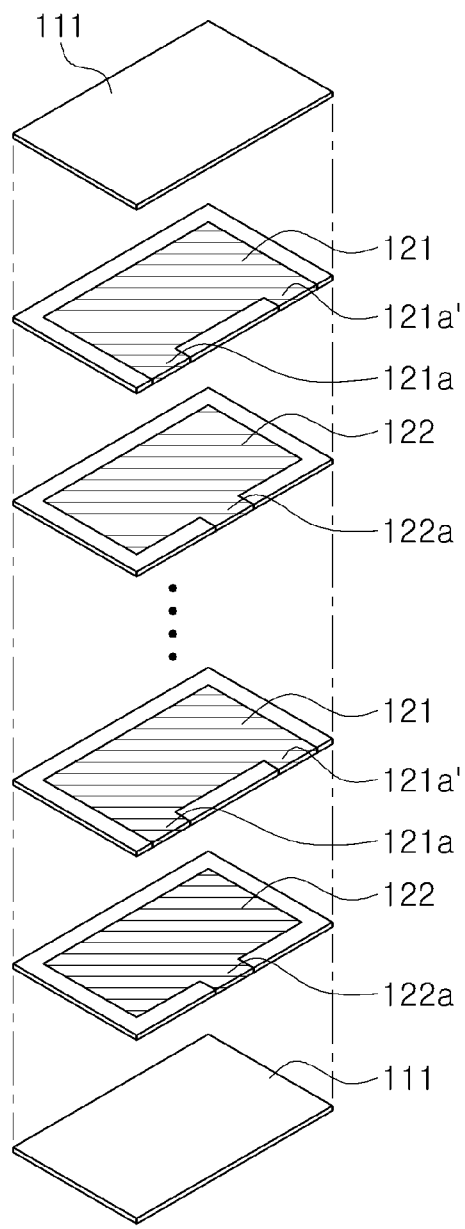
FIG. 9 is an exploded perspective view of FIG. 8.

FIG. 9 is an exploded perspective view of FIG. 8.

Referring to FIGS. 7 through 9, a multilayer ceramic capacitor 100 according to another exemplary embodiment in the present disclosure may include a ceramic body 110 including a plurality of dielectric layers 111; a first internal electrode 121 disposed in the ceramic body 110 and having first exposed portions 121a and 121a' exposed to a first side surface S5 in a width direction of the ceramic body 110 to be spaced apart from each other by a predetermined distance and a second internal electrode 122 disposed in the ceramic body 110 and having a third exposed portion 122a exposed to the first side surface S5 in the width direction of the ceramic body 110 and spaced apart from the first exposed portions 121a and 121a' by a predetermined distance; and first to third external electrodes 131, 132, and 133 disposed on the first side surface S5 in the width direction of the ceramic body 110 and connected to the first to third exposed portions 121a, 121a', and 122a, respectively, wherein in the case that a distance between the first exposed portions 121a and 121a' and the third exposed portion 122a is a, a distance from an end surface in a length direction of the ceramic body 110 to the first exposed portions 121a and 121a' is b, a length of the third exposed portion 122a in the length direction of the ceramic body 110 is G1, and a length of the first exposed portions 121a and 121a' in the length direction of the ceramic body 110 is G2, 0.235≤(G1+2*G2)/[2*(a+b)]≤2.500 may be satisfied.

The first exposed portions 121a and 121a' may be respectively configured by two exposed portions formed to be spaced apart from the third exposed portion 122a.

The dielectric layer 111 may have a thickness of 3 μm or less.

The first to third external electrodes 131, 132, and 133 may be formed to be extended to the first and second side surfaces S5 and S6 in a width direction of the ceramic body 110.

The multilayer ceramic capacitor according to another exemplary embodiment of the present disclosure may be a multilayer ceramic capacitor having a horizontally-stacked structure in which the first and second internal electrodes 121 and 122 are horizontally stacked on the first main surface S1 and the second main surface S2 in the thickness direction of the ceramic body 110 and may have three terminals, as shown in FIGS. 7 through 9, but is not limited thereto.

For example, the multilayer ceramic capacitor according to another exemplary embodiment in the present disclosure may have a form in which the internal electrodes stacked in the ceramic body are stacked to be horizontal to a mounting surface of the board.

Therefore, referring to FIG. 7, in the multilayer ceramic capacitor according to another exemplary embodiment in the present disclosure, a 'length direction' refers to an 'L' direction of FIG. 7, a 'width direction' refers to a 'W' direction of FIG. 4, and a 'thickness direction' refers to a 'T' direction of FIG. 4. Here, the 'thickness direction' is the same as a direction in which dielectric layers are stacked, for example, a 'stacking direction'.

The first internal electrode 121 and the second internal electrode 122 are alternately exposed to the first side surface S5 of the width direction of the ceramic body 110, such that a reverse geometry capacitor (RGC) or a low inductance chip capacitor (LICC) may be implemented as described below.

A general multilayer ceramic electronic component may have the external electrodes disposed on side surfaces opposing each other in the length direction of the ceramic body.

In this case, since a current path is relatively long at the time of applying an alternating current to the external electrode, a current loop may be formed to be relatively great, and thus, a magnitude of an induced magnetic field is increased, such that inductance may be increased.

In order to solve the above-mentioned problem, according to the exemplary embodiment in the present disclosure, the first to third external electrodes 131, 132, and 133 may be disposed on the first side surface S5 among the side surfaces S5 and S6 opposing each other in the width direction of the ceramic body 110 in order to decrease the length of a current path.

In addition, the first to third external electrodes 131, 132, and 133 may be formed to be extended to the first and second main surfaces S1 and S2 of the ceramic body 110.

In this case, since distances between electrodes among the first to third external electrodes 131, 132, and 133 are relatively short, the current path is relatively short, such that the current loop may be decreased, thereby decreasing inductance.

As described above, the first to third external electrodes 131, 132, and 133 may be disposed on the first side surface S5 among the side surfaces S5 and S6 opposing each other in the width direction of the ceramic body 110, and may be electrically connected to the first and second internal electrodes 121 and 122 so as to form capacitance.

For example, the first and second external electrodes 131 and 132 may be connected to the first internal electrode 121, and the third external electrode 133 may be connected to the second internal electrode 122.

A width W of the ceramic body 110 may be a distance between the first side surface S5 and the second side surface S6 in the width direction, and a length L of the ceramic body 110 may be a distance between the first end surface S3 and the second end surface S4 in the length direction.

According to the exemplary embodiment in the present disclosure, the width W between the first and second side surfaces S5 and S6 having the first to third external electrodes 131, 132, and 133 formed thereon may be shorter than or equal to the length L between the first end surface S3 and the second end surface S4 in the length direction of the ceramic body 110.

Thus, since the distances between electrodes among the first to third external electrodes 131, 132, and 133 are relatively short, the current path is relatively short, such that a size of a current loop thereof may be decreased, thereby decreasing inductance.

Such as, the multilayer ceramic electronic component in which the width W of the ceramic body 110 is shorter than or equal to the length L of the ceramic body 110 by forming the first to third external electrodes 131, 132, and 133 on the first and second side surfaces S5 and S6 in the width direction of the ceramic body 110, may refer to as a reverse geometry capacitor (RGC) or a low inductance chip capacitor (LICC).

Since the multilayer ceramic capacitor 100 according to another exemplary embodiment in the present disclosure is the reverse geometry capacitor (RGC) or the low inductance chip capacitor (LICC) as described above, a current path is relatively short at the time of mounting the multilayer ceramic capacitor on the board, such that equivalent series inductance (ESL) may be decreased.

In addition, since the multilayer ceramic capacitor 100 according to another exemplary embodiment in the present disclosure has the first to third external electrodes 131, 132, and 133 disposed on the first side surface S5 among the side surfaces S5 and S6 opposing each other in the width direction of the ceramic body 110, a distance between external electrodes is relatively short and vibrations generated from a multilayer ceramic capacitor and transferred to a board is decreased, such that acoustic noise may be decreased.

Figure 10:
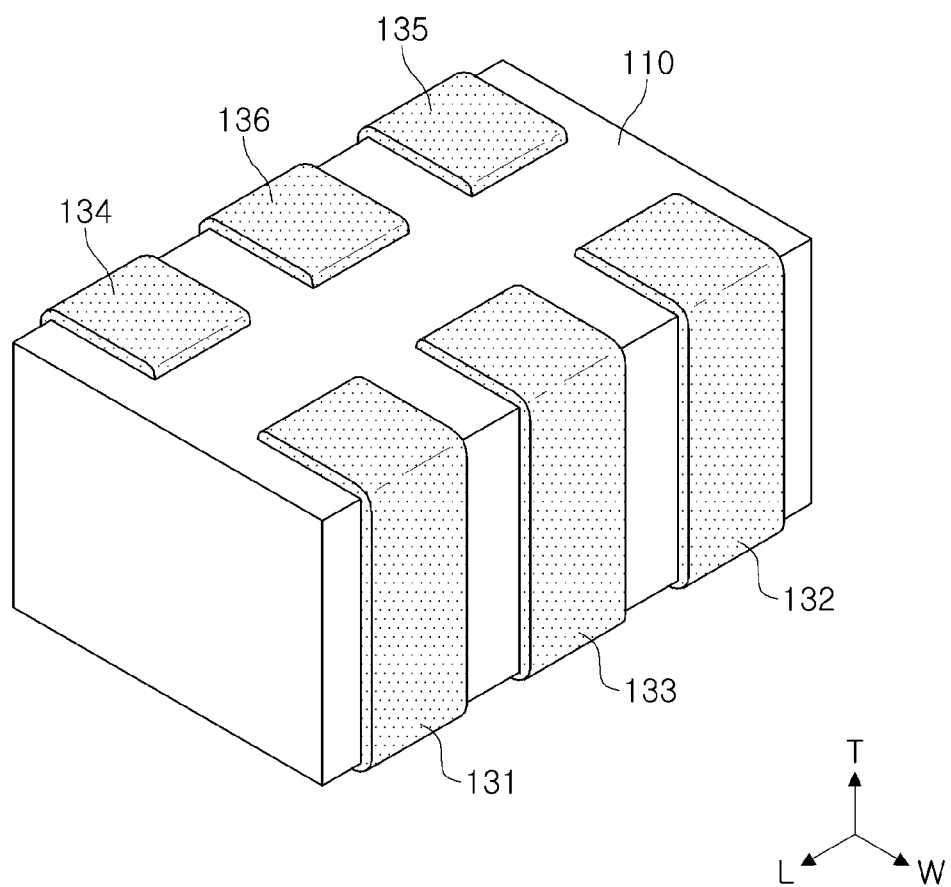
FIG. 10 is a perspective view showing a multilayer ceramic capacitor according to another exemplary embodiment in the present disclosure.

FIG. 10 is a perspective view showing a multilayer ceramic capacitor according to another exemplary embodiment of the present disclosure.

Figure 11:
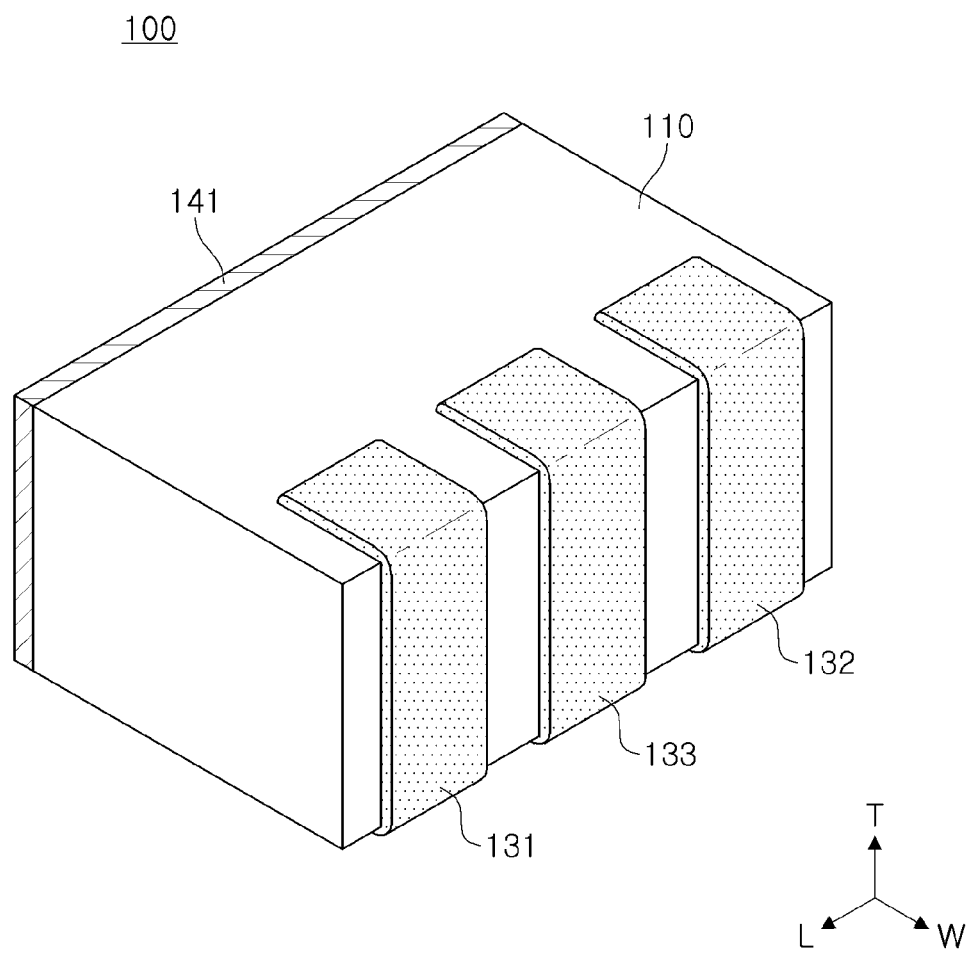
FIG. 11 is a perspective view showing a multilayer ceramic capacitor according to another exemplary embodiment in the present disclosure.

FIG. 11 is a perspective view showing a multilayer ceramic capacitor according to another exemplary embodiment in the present disclosure.

Figure 12:
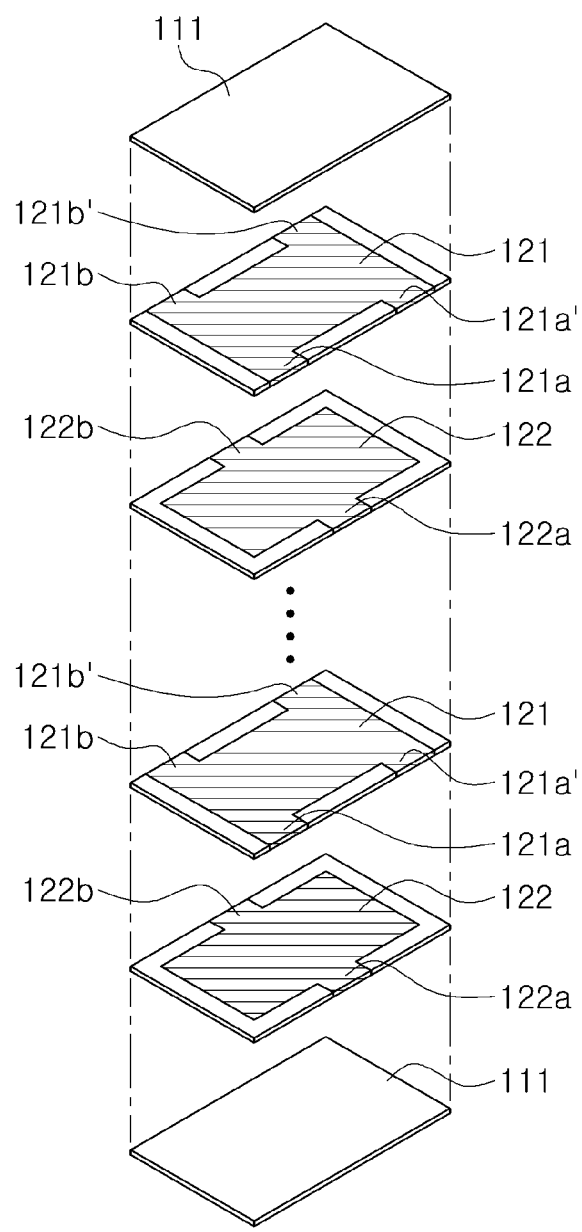
FIG. 12 is an exploded perspective view of FIGS. 10 and 11.

FIG. 12 is an exploded perspective view of FIGS. 10 and 11.

Referring to FIGS. 10 through 12, the multilayer ceramic capacitor according to another exemplary embodiment in the present disclosure may further include second exposed portions 121b and 121b' formed by the first internal electrode 121 exposed to the second side surface S6 in the width direction of the ceramic body 110 and a fourth exposed portion 122b formed by the second internal electrode 122 exposed to the second side surface S6 in the width direction of the ceramic body 110 and disposed to be spaced apart from the second exposed portions 121b and 121b' by a predetermined distance.

The second exposed portions 121b and 121b' may be configured by two exposed portions respectively formed to be spaced apart from the fourth exposed portion 122b, but are not particularly limited.

Referring to FIG. 10, the multilayer ceramic capacitor according to another exemplary embodiment in the present disclosure may further include fourth to sixth external electrodes 134, 135, and 136 disposed on the second side surface S6 in the width direction of the ceramic body 110.

In this case, the fourth to sixth external electrodes 134, 135, and 136 may be electrically connected to the first and second internal electrodes 121 and 122.

The fourth to sixth external electrodes 134, 135, and 136 may be formed to be extended to the first and second main surfaces S1 and S1 of the ceramic body 110.

Referring to FIG. 11, the multilayer ceramic capacitor according to another exemplary embodiment in the present disclosure may further include an insulating layer 141 disposed on the second side surface S6 of the ceramic body 110 in the width direction thereof.

In this case, the second exposed portions 121b and 121b' and the fourth exposed portion 122b are exposed to the second side surface S6 of the ceramic body 110 in the width direction thereof, but are insulated by the insulating layer 141, such that reliability may not be deteriorated.

Features other than the above-mentioned features of the multilayer ceramic capacitor according to another exemplary embodiment in the present disclosure are the same as those of the multilayer ceramic capacitor according to the foregoing exemplary embodiment in the present disclosure. Therefore, a description thereof will be omitted.

Hereinafter, a method of manufacturing a multilayer ceramic capacitor according to an exemplary embodiment in the present disclosure will be described. However, the present disclosure is not limited thereto.

A method of manufacturing a multilayer ceramic capacitor according to an embodiment in the present disclosure may include preparing and applying a slurry including a powder such as barium titanate ($BaTiO_3$), or the like, onto a carrier film to then be dried thereon so as to prepare a plurality of ceramic green sheets, thereby forming dielectric layers.

The ceramic green sheet may be manufactured by mixing a ceramic powder, a binder, and a solvent to manufacture a slurry and forming the prepared slurry as a sheet having a thickness of several μm by a doctor blade method.

Next, a conductive paste for an internal electrode having an average size of a nickel particle of 0.1 to 0.2 μm and including a nickel powder of 40 to 50 parts by weight may be prepared.

The conductive paste for an internal electrode may be applied to the green sheet by a screen printing method to form an internal electrode thereon, 200 to 400 layers of green sheets may then be stacked to form an active layer, and the ceramic green sheet may be stacked on an upper or lower surface of the active layer to form a cover layer, such that the ceramic body including first and second main surfaces opposing each other, first and second side surfaces opposing each other, and first and second end surfaces opposing each other may be manufactured.

Next, the first to third external electrodes may be formed on the first side surface of a width direction of the ceramic body.

Hereafter, the present disclosure will be described in detail with reference to examples, but is not limited thereto.

EXPERIMENTAL EXAMPLE

Multilayer ceramic capacitors according to Embodiment and Comparative Example were manufactured as follows.

A slurry containing a powder such as barium titanate ($BaTiO_3$), or the like, was applied to and dried on a carrier film to prepare a plurality of ceramic green sheets having a thickness of 1.8 μm.

Next, a conductive paste for a nickel internal electrode was applied to the ceramic green sheet using a screen printing method to form an internal electrode.

About 200 layers of ceramic green sheets were stacked. Here, a greater amount of ceramic green sheets without the internal electrodes formed thereon were stacked on a lower portion of the ceramic green sheet having the internal electrode formed thereon other than being stacked on an upper portion thereof. The multilayer body was isostatically pressed at a pressure of 1000 kgf/$cm^2$ at a temperature of 85° C.

The ceramic multilayer body completed in the pressing process was cut into portions corresponding to individual chips to then be subjected to a debinding treatment and maintained at a temperature of 230° C. for 60 hours in an air atmosphere.

Then, the ceramic multilayer body was sintered at a temperature of 1200° C. under a reduction atmosphere having oxygen partial pressure of $10^{-11}$ to $10^{-10}$ atm lower than oxygen partial pressure in a state in which Ni/NiO are balanced, such that the internal electrode is not oxidized. After the sintering process is performed, a multilayer chip capacitor had a chip size of length×width (L×W) of about 1.0 mm×0.5 mm (L×W, 1005 size). Here, fabrication tolerance was set in a range within ±0.1 mm in length×width (L×W). By performing an experiment while satisfying the above-mentioned fabrication tolerance, tests of whether or not a short-circuit defect occurred after the board was mounted were conducted, and tests for measurements of the equivalent series inductance (ESL) and acoustic noise were conducted.

Respective experiments were performed for 100 samples.

Cases in which a measured value of acoustic noise was 30 dB or less were determined as being good and cases in which a value of the equivalent series inductance (ESL) was 60 pH or less were determined as being good.

The following Table 1 illustrates whether or not the short-circuit defect is caused after the capacitor is mounted on the board and illustrates measured values of an equivalent series inductance (ESL) and acoustic noise according to a relational equation, (G1+2*G2)/[2*(a+b)], between the distance a between the first exposed portion 21a and the third exposed portion 22a, the distance b from the end portion of the ceramic body 10 in the length direction thereof to the first exposed portion 21a, the distance G1 of the third exposed portion 22a in the length direction of the ceramic body, and the distance G2 of the first exposed portion 21a in the length direction of the ceramic body.

TABLE 1

| No | G1 | G2 | a | b | (G1 + 2G2)/ 2*(a + b) ratio | Short-circuit defect after capacitor is mounted on board | ESL [pH] | Acostic Noise [dB] |
|---|---|---|---|---|---|---|---|---|
| 1 | 0.05 | 0.1 | 0.35 | 0.05 | 0.313 | ⊚ | 57.3 | 20.2 |
| 2 | 0.1 | 0.1 | 0.325 | 0.05 | 0.400 | ⊚ | 50.9 | 21.8 |
| 3 | 0.15 | 0.1 | 0.3 | 0.05 | 0.500 | ⊚ | 48.6 | 22.3 |
| 4 | 0.2 | 0.1 | 0.275 | 0.05 | 0.615 | ⊚ | 47.3 | 23.5 |

TABLE 1-continued

| No | G1 | G2 | a | b | (G1 + 2G2)/ 2*(a + b) ratio | Short-circuit defect after capacitor is mounted on board | ESL [pH] | Acoustic Noise [dB] |
|---|---|---|---|---|---|---|---|---|
| 5 | 0.25 | 0.1 | 0.25 | 0.05 | 0.750 | ◎ | 46.7 | 24.3 |
| 6 | 0.3 | 0.1 | 0.275 | 0.05 | 0.909 | ◎ | 45.9 | 24.5 |
| 7 | 0.35 | 0.1 | 0.2 | 0.05 | 1.100 | ◎ | 45.1 | 25.2 |
| 8 | 0.4 | 0.1 | 0.175 | 0.05 | 1.333 | ◎ | 44.8 | 25.8 |
| 9 | 0.45 | 0.1 | 0.15 | 0.05 | 1.625 | ◎ | 43.8 | 26.7 |
| 10 | 0.5 | 0.1 | 0.125 | 0.05 | 2.000 | ◎ | 43.5 | 28.1 |
| 11 | 0.55 | 0.1 | 0.1 | 0.05 | 2.500 | ○ | 42.5 | 29.5 |
| *12 | 0.6 | 0.1 | 0.075 | 0.05 | 3.200 | X | 42.1 | 30.7 |
| *13 | 0.65 | 0.1 | 0.05 | 0.05 | 4.250 | X | — | — |
| *14 | 0.7 | 0.1 | 0.025 | 0.05 | 6.000 | X | — | — |
| 15 | 0.1 | 0.05 | 0.375 | 0.05 | 0.235 | ◎ | 58.5 | 20.5 |
| 16 | 0.1 | 0.1 | 0.325 | 0.05 | 0.400 | ◎ | 51.4 | 21.5 |
| 17 | 0.1 | 0.15 | 0.275 | 0.05 | 0.615 | ◎ | 48.5 | 23.4 |
| 18 | 0.1 | 0.2 | 0.225 | 0.05 | 0.909 | ◎ | 46.5 | 25.6 |
| 19 | 0.1 | 0.25 | 0.175 | 0.05 | 1.333 | ◎ | 45.2 | 26.8 |
| 20 | 0.1 | 0.3 | 0.125 | 0.05 | 2.000 | ○ | 44.3 | 28.2 |
| *21 | 0.1 | 0.35 | 0.075 | 0.05 | 3.200 | X | 43.5 | 31.5 |
| *22 | 0.1 | 0.4 | 0.025 | 0.05 | 6.000 | X | — | — |
| 23 | 0.13 | 0.13 | 0.325 | 0.01 | 0.567 | ◎ | 50.4 | 28.5 |
| 24 | 0.11 | 0.11 | 0.325 | 0.03 | 0.479 | ◎ | 50.9 | 27.4 |
| 25 | 0.10 | 0.10 | 0.325 | 0.05 | 0.400 | ◎ | 51.2 | 25.3 |
| 26 | 0.09 | 0.09 | 0.325 | 0.07 | 0.329 | ◎ | 55.4 | 24.2 |
| 27 | 0.07 | 0.07 | 0.325 | 0.1 | 0.235 | ◎ | 57.3 | 23.4 |
| *28 | 0.05 | 0.05 | 0.325 | 0.12 | 0.180 | ◎ | 69.5 | 21.5 |
| *29 | 0.03 | 0.03 | 0.325 | 0.15 | 0.105 | ◎ | 75.2 | 20.9 |
| *30 | 0.01 | 0.01 | 0.325 | 0.18 | 0.040 | ◎ | 105.3 | 20.1 |

X: defect rate of 50% or more
Δ: defect rate of 1% to 50%
○: defect rate of 0.01% to 1%
◎: defect rate below 0.01%
*Comparative Example Referring to Table 1, the cases of samples 1 to 11, 15 to 20, and 23 to 27 are cases in which a value of a relational equation, (G1+2*G2)/[2*(a+b)] satisfies 0.235≤(G1+2*G2)/[2*(a+b)]≤2.500. Here, it may be appreciated that acoustic noise is decreased, the equivalent series inductance (ESL) is also decreased, and the short-circuit defect is not caused even after the capacitor is mounted on the board.

On the other hand, in the case of samples 12 to 14, 21, and 22, comparative examples deviating from a numerical value range of the present disclosure, it may be appreciated that the short-circuit defect is caused after the capacitor is mounted on the board and acoustic noise is also increased.

In addition, in the cases of samples 28 to 30, comparative examples deviating from a numerical value range of the present disclosure, it may be appreciated that the equivalent series inductance ESL is increased.

Board for Mounting of Multilayer Ceramic Capacitor

Figure 13:
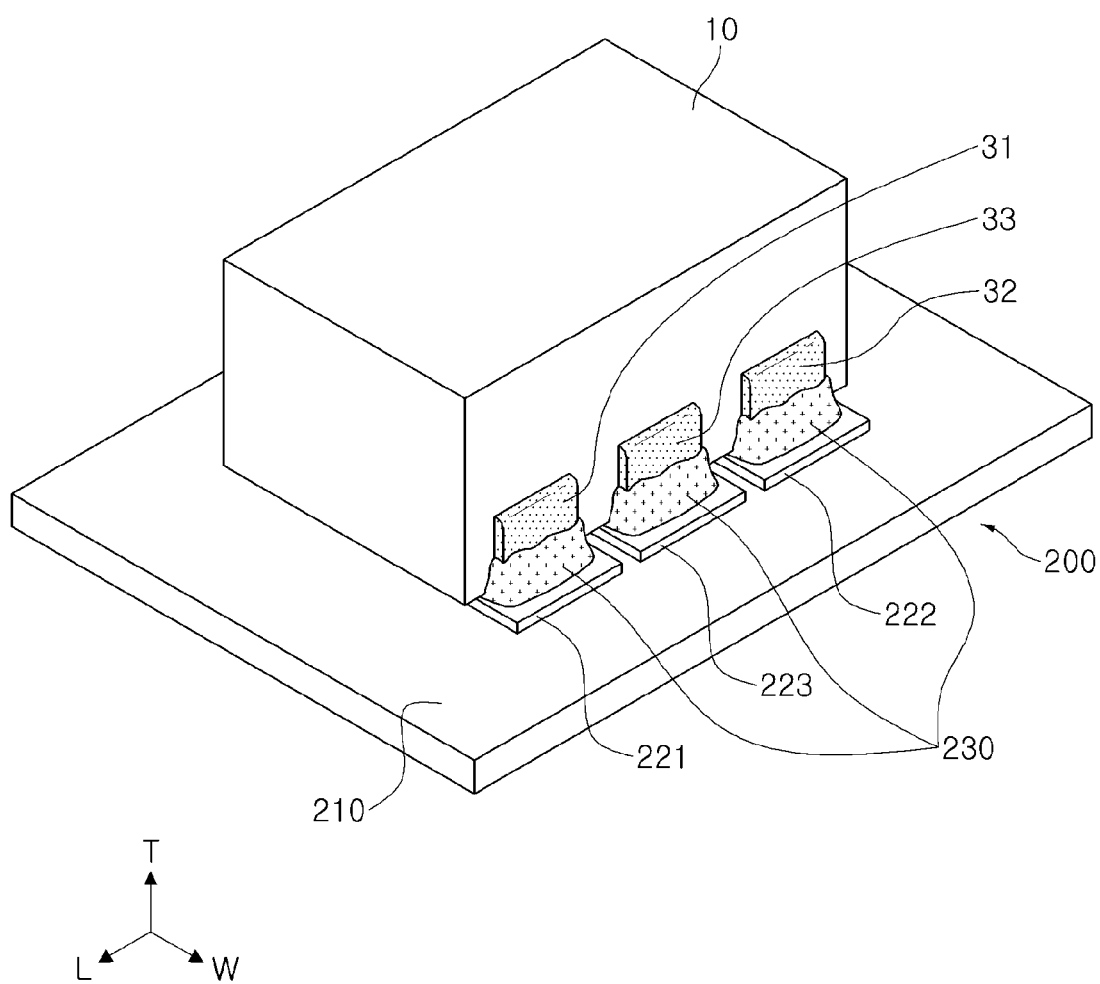
FIG. 13 is a perspective view illustrating a form in which the multilayer ceramic capacitor of FIG. 1 is mounted on a printed circuit board.

FIG. 13 is a perspective view illustrating a form in which the multilayer ceramic capacitor of FIG. 1 is mounted on a printed circuit board.

Figure 14:
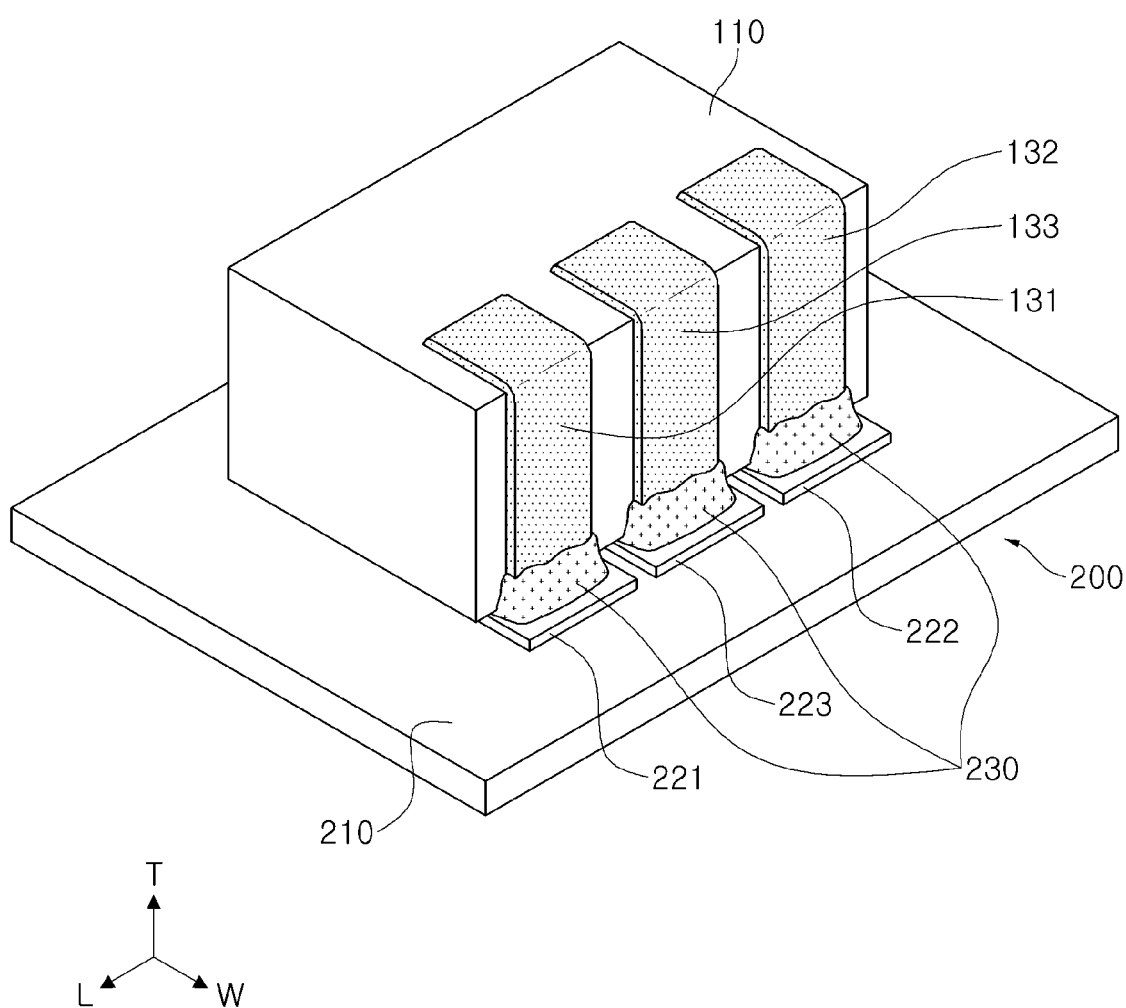
FIG. 14 is a perspective view showing a form in which the multilayer ceramic capacitor of FIG. 7 is mounted on a printed circuit board.

FIG. 14 is a perspective view showing a form in which the multilayer ceramic capacitor of FIG. 7 is mounted on a printed circuit board.

Referring to FIG. 13, a board 200 for the mounting of a multilayer ceramic capacitor 1 according to another exemplary embodiment of the present disclosure may include a printed circuit board 210 on which the multilayer ceramic capacitor 1 is vertically mounted, and first to third electrode pads 221, 222, and 223 formed on an upper surface of the printed circuit board 210 so as to be spaced apart from one another.

In this case, the multilayer ceramic capacitor 1 may be electrically connected to the printed circuit board 210 by a soldering 230 in a state in which the external electrodes 31, 32, and 33 are respectively disposed on the first to third electrode pads 221, 222, and 223 so as to be in contact with each other.

When a voltage is applied in a state in which the multilayer ceramic capacitor 1 is mounted on the printed circuit board 210 as described above, acoustic noise may occur.

In this case, the size of the first to third electrode pads 221, 222, and 223 may be an index for determining an amount of the soldering 230 connecting the external electrodes of the multilayer ceramic capacitor 1 to the first to third electrode pads 221, 222, and 223, and a magnitude of acoustic noise may be adjusted according to the amount of the soldering 230.

In the case of the multilayer ceramic capacitor 1, as the distance b from the end portion of the ceramic body 10 in the length direction thereof to the first exposed portion 21a is greater than 0 and is increased, a solder amount applied to the end portion of the multilayer ceramic capacitor in the length direction thereof at the time of mounting the multilayer ceramic capacitor on the board is significantly low and a displacement amount of solder transferred to the board is decreased, such that acoustic noise may be decreased.

In detail, the board 200 for the mounting of the multilayer ceramic capacitor 1 according to another exemplary embodiment of the present disclosure has the internal electrodes 21 and 22 disposed to be perpendicular to a board on which the multilayer ceramic capacitor is mounted, and since the internal electrodes 21 and 22 are not exposed to the first end surface S3 and the second end surface S4 in the length direction of the ceramic body 10 and the first to third external electrodes 31, 32, and 33 are not disposed on the first end surface S3 and the second end surface S4 of the ceramic body 10 in the length direction thereof, a solder amount applied to the end portion of the multilayer ceramic capacitor in the length direction thereof is significantly low and a displacement amount of solder transferred to the board is decreased, such that acoustic noise may be decreased.

On the other hand, in a general case in which the multilayer ceramic capacitor has the internal electrodes disposed to be perpendicular to a board on which the multilayer ceramic capacitor is mounted, since the external electrodes are also disposed on the end surfaces of the ceramic body in the length direction thereof, acoustic noise may be increased.

Referring to FIG. 14, a board 200 for mounting of a multilayer ceramic capacitor 100 according to the exemplary embodiment of the present disclosure may include a printed circuit board 210 on which the multilayer ceramic capacitor 100 is horizontally mounted, and first to third electrode pads 221, 222, and 223 formed on an upper surface of the printed circuit board 210 so as to be spaced apart from one another.

In this case, the multilayer ceramic capacitor 100 may be electrically connected to the printed circuit board 210 by a soldering 230 in a state in which the external electrodes 131, 132, and 133 are respectively disposed on the first to third electrode pads 221, 222, and 223 so as to be in contact with each other.

When voltages having different polarities are applied to the first to sixth external electrodes formed on side surfaces in the width direction of the multilayer ceramic capacitor 100 in a state in which the multilayer ceramic capacitor 100 is mounted on the printed circuit board 210, the ceramic body 110 may be expanded and contracted in the thickness direction by an inverse piezoelectric effect of the dielectric layer 111, and the first to third external electrodes may be contracted and expanded by a Poisson effect in a direction opposite to that of the expansion and contraction of the ceramic body 110 performed in the thickness direction of the ceramic body 10.

In detail, the contraction and expansion are generated to be displaced by about 20 nm in the thickness direction of the multilayer ceramic capacitor, displaced by about 4 nm in the length direction thereof, and displaced by about 2 nm in the width direction thereof.

Here, since the multilayer ceramic capacitor according to the exemplary embodiment in the present disclosure has the first to third external electrodes formed on the side surfaces of the ceramic body in the width direction of the multilayer ceramic capacitor, displacement of the contraction and expansion is significantly decreased, such that acoustic noise may be decreased.

As set forth above, according to exemplary embodiments in the present disclosure, a distance between external electrodes is relatively short and transfer characteristics that vibrations generated from a multilayer ceramic capacitor to aboard is deteriorated, such that acoustic noise may be decreased.

In addition, when a multilayer ceramic capacitor according to an exemplary embodiment in the present disclosure is mounted on a board, a mounting area may be decreased.

While exemplary embodiments have been shown and described above, it will be apparent to those skilled in the art that modifications and variations could be made without departing from the spirit and scope of the invention as defined by the appended claims.

What is claimed is:

1. A multilayer ceramic capacitor comprising:
   a ceramic body including a plurality of dielectric layers;
   a first internal electrode disposed in the ceramic body and having first noise adjusting portions exposed to one side surface of the ceramic body to be spaced apart from each other by a predetermined distance;
   a second internal electrode disposed in the ceramic body and having a third noise adjusting portion exposed to the one side surface of the ceramic body and spaced apart from the first noise adjusting portions by a predetermined distance; and
   first to third external electrodes disposed on the one side surface of the ceramic body and connected to the first to third noise adjusting portions, respectively,
   wherein a distance between the first noise adjusting portions and the third noise adjusting portion, a distance from an end surface of the ceramic body in a length direction of the ceramic body to the first noise adjusting portion, and a length of the first noise adjusting portions and the third noise adjusting portion in the length direction of the ceramic body are adjusted to control acoustic noise, and
   wherein the first noise adjusting portions have two noise adjusting portions spaced apart from the third noise adjusting portion, and are spaced apart from the end surface of the ceramic body by a predetermined distance in the length direction.

2. The multilayer ceramic capacitor of claim 1, wherein the first internal electrode further comprises second noise adjusting portions exposed to the other side surface opposing the one side surface of the ceramic body and the second internal electrode further comprises a fourth noise adjusting portion exposed to the other side surface of the ceramic body and disposed to be spaced apart from the second noise adjusting portions by a predetermined distance.

3. The multilayer ceramic capacitor of claim 2, wherein the ceramic body has an insulating layer further disposed on the other side surface of the ceramic body.

4. The multilayer ceramic capacitor of claim 2, further comprising fourth to sixth external electrodes disposed on the other side surface of the ceramic body and connected to the second to fourth noise adjusting portions, respectively.

5. The multilayer ceramic capacitor of claim 1, wherein when the distance between the first noise adjusting portion and the third noise adjusting portion is a, the distance from the end surface of the ceramic body in the length direction to the first noise adjusting portion is b, and the length of the third noise adjusting portion in the length direction of the ceramic body is G1, and the length of the first noise adjusting portion in the length direction of the ceramic body is G2, $0.235 \leq (G1+2*G2)/[2*(a+b)] \leq 2.500$ is satisfied.

6. A multilayer ceramic capacitor comprising:
   a ceramic body including a plurality of dielectric layers;
   a first internal electrode disposed in the ceramic body and having first exposed portions exposed to a first side surface in a width direction of the ceramic body to be spaced apart from each other by a predetermined distance and a second internal electrode disposed in the ceramic body and having a third exposed portion exposed to the first side surface in the width direction of the ceramic body and spaced apart from the first exposed portions by a predetermined distance; and
   first to third external electrodes disposed on the first side surface in the width direction of the ceramic body and connected to the first to third exposed portions, respectively,
   wherein in the case that a distance between the first exposed portions and the third exposed portion is a, a distance from an end surface in a length direction of the ceramic body to the first exposed portions is b, a length of the third exposed portion in the length direction of the ceramic body is G1, and a length of the first exposed portions in the length direction of the ceramic body is G2, $0.235 \leq (G1+2*G2)/[2*(a+b)] \leq 2.500$ is satisfied, and wherein the first exposed portions have two exposed portions spaced apart from the third exposed portion, and are spaced apart from the end surface of the ceramic body by a predetermined distance in the length direction.

7. The multilayer ceramic capacitor of claim 6, wherein the first internal electrode further comprises a second exposed portion exposed to a second side surface in the width direction of the ceramic body and the second internal electrode further comprises a fourth exposed portion exposed to the second side surface in the width direction of the ceramic body and disposed to be spaced apart from the second exposed portion by a predetermined distance.

8. The multilayer ceramic capacitor of claim 7, wherein the ceramic body has an insulating layer further disposed on the second side surface of the ceramic body in the width direction.

9. The multilayer ceramic capacitor of claim 7, further comprising fourth to sixth external electrodes disposed on the second side surface in the width direction of the ceramic body and connected to the second to fourth exposed portions, respectively.

10. The multilayer ceramic capacitor of claim 7, wherein the second exposed portions are respectively configured by two exposed portions formed to be spaced apart from the fourth exposed portion.

11. A multilayer ceramic capacitor comprising:
a ceramic body including a plurality of dielectric layers;
a first internal electrode disposed in the ceramic body and having first exposed portions exposed to a second main surface in a thickness direction of the ceramic body to be spaced apart from each other by a predetermined distance and a second internal electrode disposed in the ceramic body and having a third exposed portion exposed to the second main surface in the thickness direction of the ceramic body and spaced apart from the first exposed portions by a predetermined distance; and
first to third external electrodes disposed on the second main surface in the thickness direction of the ceramic body and connected to the first to third exposed portions, respectively,
wherein in the case that a distance between the first exposed portions and the third exposed portion is a, a distance from an end surface in a length direction of the ceramic body to the first exposed portions is b, a length of the third exposed portion in the length direction of the ceramic body is G1, and a length of the first exposed portions in the length direction of the ceramic body is G2, $0.235 \leq (G1+2*G2)/[2*(a+b)] \leq 2.500$ is satisfied, and wherein the first exposed portions have two exposed portions spaced apart from the third exposed portion, and are spaced apart from the end surface of the ceramic body by a predetermined distance in the length direction.

12. The multilayer ceramic capacitor of claim 11, wherein the first internal electrode further comprises a second exposed portion exposed to a first main surface in the thickness direction of the ceramic body and the second internal electrode further comprises a fourth exposed portion exposed to the first main surface in the thickness direction of the ceramic body and disposed to be spaced apart from the second exposed portion by a predetermined distance.

13. The multilayer ceramic capacitor of claim 12, wherein the ceramic body has an insulating layer further disposed on the first main surface of the ceramic body in the thickness direction.

14. The multilayer ceramic capacitor of claim 12, further comprising fourth to sixth external electrodes disposed on the first main surface in the thickness direction of the ceramic body and connected to the second to fourth exposed portions, respectively.

15. The multilayer ceramic capacitor of claim 12, wherein the second exposed portions are respectively configured by two exposed portions formed to be spaced apart from the fourth exposed portion.

16. A board for mounting of a multilayer ceramic capacitor, the board comprising:
a printed circuit board having first to third electrode pads formed on an upper portion thereof; and
the multilayer ceramic capacitor of claim 1 installed on the printed circuit board.

17. A board for mounting of a multilayer ceramic capacitor, the board comprising:
a printed circuit board having first to third electrode pads formed on an upper portion thereof; and
the multilayer ceramic capacitor of claim 6 installed on the printed circuit board.

18. A board for mounting of a multilayer ceramic capacitor, the board comprising:
a printed circuit board having first to third electrode pads formed on an upper portion thereof; and
the multilayer ceramic capacitor of claim 11 installed on the printed circuit board.

* * * * *